(No Model.)
G. W. WEISS.
PNEUMATIC TIRE.
No. 569,074. Patented Oct. 6, 1896.
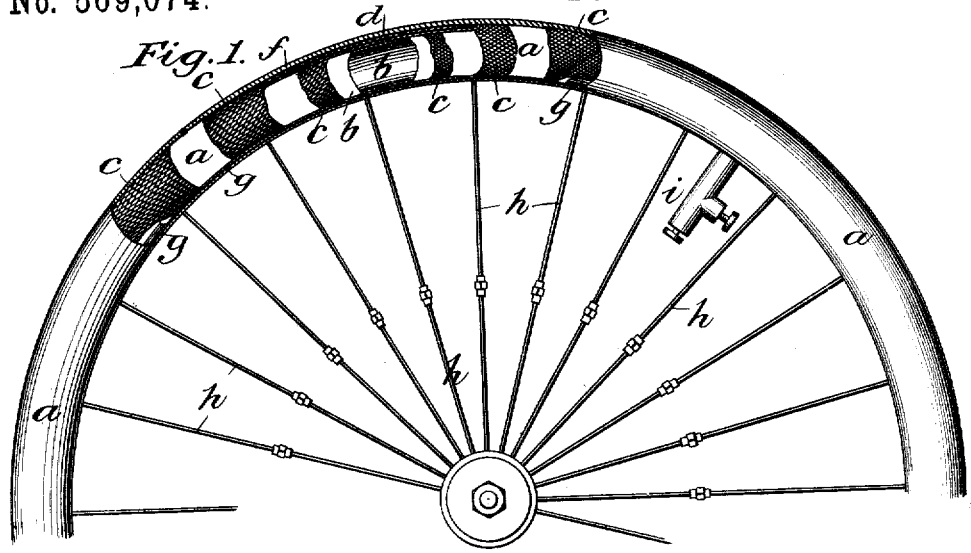
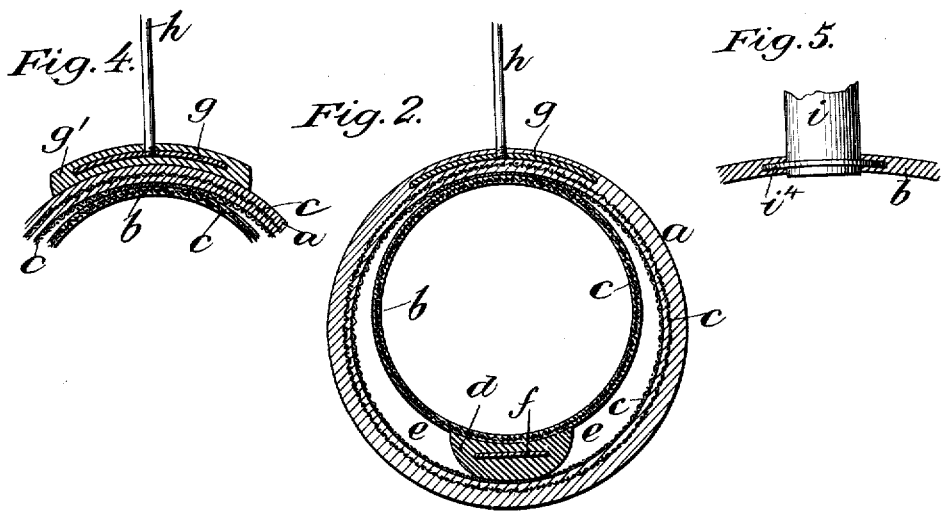
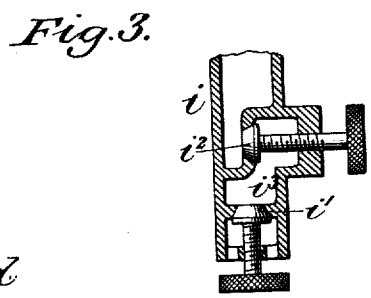
Witnesses:—
D. N. Hayford
F. W. Dane
Inventor:—
Geo. W. Weiss
by Chas. F. Dane
his atty

UNITED STATES PATENT OFFICE.

GEORGE W. WEISS, OF BROOKLYN, NEW YORK.

PNEUMATIC TIRE.

SPECIFICATION forming part of Letters Patent No. 569,074, dated October 6, 1896.

Application filed February 24, 1893. Serial No. 463,606. (No model.)

*To all whom it may concern:*

Be it known that I, GEORGE W. WEISS, a citizen of the United States, and a resident of Brooklyn, Kings county, and State of New York, have invented new and useful Improvements in Pneumatic Tires, of which the following description, taken in connection with the drawings herewith accompanying, is a specification.

My invention consists, first, in the construction of the outer sheathing-tube and the inclosed inflatable tube, whereby their liability of being punctured is obviated without decreasing their resiliency or flexibility; secondly, in interposing a cushion of rubber or similar flexible material between the tubes at the outer bearing-surface of the tire as an additional protection to the inner tube and at the same time form a space or chamber between the tubes at either side of the central bearing-surface, whereby the outer tube has an increased resiliency to yield to any object that might engage therewith and cause the same to glance therefrom and thus decrease the liability of the tire being punctured and also lessen the jar produced by such contact; thirdly, in locating a thin strip of suitable flexible metal in the said cushion between the inner and outer tubes as an additional safeguard to prevent the inclosed inflatable tube from being punctured; fourthly, in the manner of connecting the tire with the supporting metal rim, whereby the liability of the tire becoming detached from the latter in the ordinary use of the same is obviated; fifthly, in the construction of the valve connecting with the inflatable tube, whereby leakage is prevented while the pump or other inflating device for forcing air through the same is being attached or detached from connection therewith, and, sixthly, in other details of construction and combination of parts as will hereinafter be set forth in detail, and pointed out in the claim.

Referring to the drawings, Figure 1 represents a portion of a bicycle-wheel with my improved pneumatic tire thereon, showing different sectional views of the latter. Fig. 2 represents a cross-section of the tire and a connecting-spoke. Fig. 3 represents a longitudinal sectional view through the center of the inflatable tube-valve, and Figs. 4 and 5 represent detail views to be hereinafter referred to.

To explain in detail, $a$ represents the outer sheathing-tube, and $b$ the inclosed inflatable tube. According to my invention I locate, by suitable process, a closely-woven wire-cloth within the outer tube $a$, as shown at $c$ in Fig. 2. This wire-cloth, which is preferably formed of brass wire, is woven so close as to prevent the passage of any object through the same, and at the same time is of such flexibility as not to decrease the resiliency of the tire in which it is located in any material degree. As an additional protection to prevent the admission of any pointed object into the inclosed tube that might have passed through the outer tube, I have also located a similar metal or wire cloth within the inclosed tube $b$ and another on the inner surface of the outer tube $a$, as more clearly shown in Fig. 2. The number and location of such wire linings or partitions, however, may be varied somewhat to secure the same result and without departing from the spirit of my invention, as will be obvious. I have also located a cushion $d$, formed of rubber or similar suitable material, at a point between the inner and outer tubes at the outer bearing-surface of the tire, as clearly shown in Fig. 2. This cushion $d$ affords additional strength and thickness to the tire at its central bearing-surface, and also acts as a means to form an air space or chamber between the tubes at each side of the central or direct bearing-surface of the tire, as shown at $e\ e$ in Fig. 2. These chambers $e\ e$ serve to lighten the tire and also to allow a greater degree of elasticity to the outer or sheathing tube at either side of its central bearing-surface in order to yield to any object that might come in contact therewith, and thereby decrease the liability of its being punctured or otherwise injured and also lessen the jar to the wheel caused by such contact.

As an additional protection or safeguard to prevent any liability of the inflatable tube $b$ being punctured at its most exposed position—viz., adjacent to the outer bearing-surface of the tire—I have located a strip of thin flexible metal $f$ in the cushion $d$, which extends entirely around the tire, and this, as will be obvious, will act as a wall to prevent any possibility of the inner tube being punctured at such portion of the tire. This said plate may, however, be located between the inner and outer tubes at a point other than in the cushion $d$, as described, without departing from the spirit of my invention.

The metal rim of the wheel represented at $g$, upon which the tire is supported and secured, is in the present instance shown and according to my invention located within or between the surfaces of the outer sheathing-tube, as clearly shown in Fig. 2, and the spokes $h$ are connected therewith by being screwed into the same, as shown. This form of connection between the tire and the metal rim obviates the liability of the tire becoming detached from the latter while in use, which liability has been found to be the great objection when they have been secured thereon in the usual manner as heretofore.

In some instances I locate the rim $g$ in a separate piece of rubber or similar material, as shown at $g'$ in Fig. 4, which latter is adapted to be secured to the sheathing-tube, as it is well understood that a rubber piece, as $g'$, may be cemented or similarly attached to the sheathing-tube and a much stronger connection be made than between the metal rim and the sheathing-tube.

The stem or valve represented at $i$, connecting with the inflatable tube, through which the air is forced into the latter by a suitable inflating device, is provided with two valves $i'$ and $i^2$ and an intermediate chamber $i^3$, the object of the central or intermediate valve being to close the passage between the inflatable tube and the outer valve while the latter is open during the operation of connecting or disconnecting the inflating device with the end of the stem $i$, and thus prevent any leakage during such operation, as will be readily understood. After the inflating device is detached from the stem $i$ the outer valve $i'$ is closed to close the chamber between the valves and thus prevent any possibility of leakage. The valve is also provided with a flange $i^4$ thereon, which is adapted to be located at a point between the surfaces of the connecting-tube, as shown in Fig. 5, in order to break the joint between the connecting-valve with the tube and thus prevent liability of any leakage at such point, as will be readily understood.

Having thus set forth my invention, what I claim as new, and desire to secure by Letters Patent of the United States, is—

A pneumatic tire, consisting of an outer flexible sheathing-tube, an inclosed inflatable tube, a cushion located between said tubes adjacent to the tread of the tire, the said cushion being of a substantially semicircular form in cross-section and arranged with its outer curved surface as a support to the sheathing-tube, whereby an air-space is formed between the tubes at each side thereof from a central point at the tread of the tire to the inner side of the same opposite said tread, the inflatable tube being of such dimensions in cross-section relative to the sheathing-tube as to only contact on one side with the said cushion and on its opposite side with said sheathing-tube at a central point on its inner side, substantially as described and for the purpose set forth.

GEORGE W. WEISS.

Witnesses:
CHAS. F. DANE,
A. L. HAYES.